May 30, 1944.    J. D. SPALDING    2,350,079
ROLLER BEARING
Filed June 6, 1939    2 Sheets-Sheet 1

Inventor
John D. Spalding
By Lyon & Lyon
Attorneys

Inventor
John D. Spalding
By Lyon & Lyon
Attorneys

Patented May 30, 1944

2,350,079

UNITED STATES PATENT OFFICE 2,350,079

ROLLER BEARING

John D. Spalding, Los Angeles, Calif., assignor to The National Supply Company, Pittsburgh, Pa., a corporation of Pennsylvania Application June 6, 1939, Serial No. 277,612

4 Claims. (Cl. 308—231)

This invention relates to anti-friction roller bearings, and more particularly to such bearings as employ tapered rollers operating between companion raceways, and to means for absorbing the end thrust imposed upon such rollers.

In the use of anti-friction roller bearings there is customarily provided a guide flange on one or both of the companion raceways which is adapted to contact the end surface of each roller to absorb thrust. The operative surface of the guide flange and the end surface of the rollers are commonly formed as conic sections, although it is recognized that this arrangement results in excessive frictional forces between surfaces which are difficult to lubricate adequately.

In the heavy duty bearings of this type, unit pressures due to end thrust are of such magnitude that the life of the bearing is measured by the life of the end thrust surfaces rather than the life of the roll surfaces or raceways. This is particularly true in the utilization of such anti-friction bearings as are required to carry and transmit extremely heavy loads. Efforts have been made to avoid these difficulties and to design a bearing wherein the life under heavy duty would not be so limited by the life of the end thrust surfaces and one effort in this respect has been to provide spherical end rollers operating against spherical thrust flanges which under certain conditions have been found to operate satisfactorily but under extremely heavy load or service this form of construction has been found to be unsatisfactory.

It is therefore the principal object of my invention to provide an anti-friction bearing including tapered rollers operating between companion raceways, the rollers each having an improved form of contact with a guide flange whereby the life of the bearing as a whole is substantially prolonged.

Another object of my invention is to provide a form of contact between the end thrust surfaces of such rollers and the cooperating guide flange whereby the formation of an oil wedge of optimum proportions is obtained.

Another object of my invention is to provide rollers having spherical end surfaces adapted to impart thrust to a non-spherical guide flange along a theoretical line contact.

Another object of my invention is to provide rollers having a spherical end surface cooperatively related to a non-spherical guide flange in such manner as to impart thrust along a theoretical line of contact wherein the relationship of the spherical end surface and the non-spherical guide flange is so proportioned as to produce a clearance between the spherical end surface and the non-spherical guide flange of such magnitude as to produce a lubrication wedge in the neighborhood of the film thickness of the particular lubricant employed.

Other objects and advantages of this invention it is believed will be apparent from the following detailed description of a preferred embodiment thereof as illustrated in the accompanying drawings.

Figure 2:
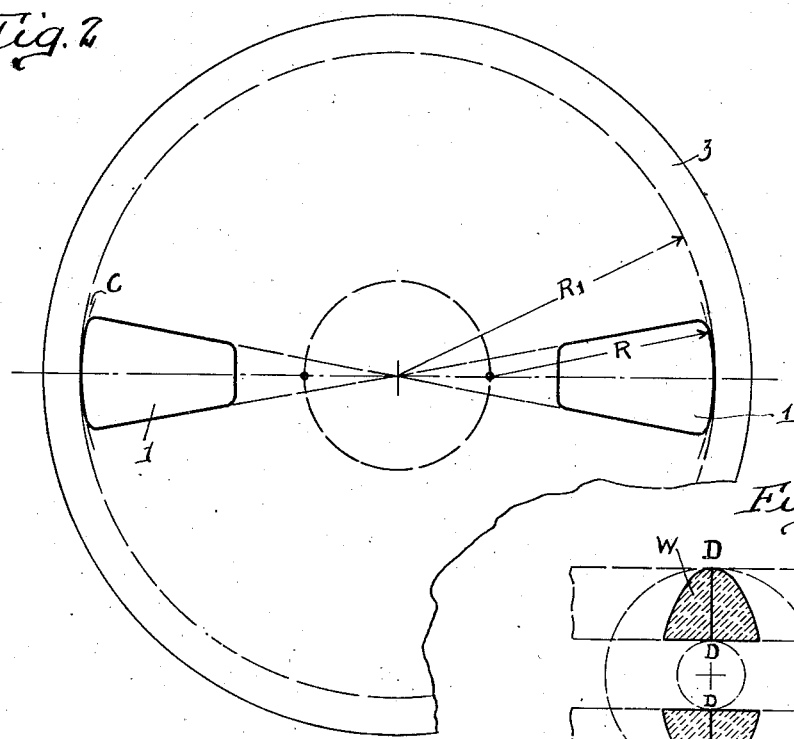
Figure 2 is a top plan view thereof illustrating the same with the upper race removed and wherein all but two of the rollers have been omitted for clarity.

In the drawings the tapered rollers 1 are adapted to roll between annular race plates 2 and 3. The word "tapered" as herein utilized is intended to include any conoidal shape or any other profile in which the generating elements of the roll surfaces converge toward the rotational axis of the roller.

The large end of each roller 1 is provided with a thrust-imparting surface 4. A guide flange 6 is provided on one or both of the companion raceways 2 and 3. This guide flange 6 has a thrust-receiving surface 7 adapted to receive the outward thrust imparted by the rollers 1.

The form of contact between the roller surface 4 and the flange surface 7 is determined by the shape of the surfaces themselves.

In the conventional form of bearings having rollers with spherical end surfaces, the contact between the rollers and guide flange is a surface contact as distinguished from a point or line contact. This is true because the rollers and guide are formed on the surface of a sphere common to both. In this form of surface contact, excessive sliding occurs adjacent the outer periphery of the roller end surface 4, and furthermore, it is difficult to maintain an oil film between the thrust surfaces 4 and 7 because the rolling movement of the roller serves to wipe the oil from between the thrust surfaces 4 and 7.

In accordance with my invention, the thrust surfaces 4 and 7 are so formed as to maintain an oil wedge of optimum proportions automatically between the surfaces 4 and 7.

Figure 1:
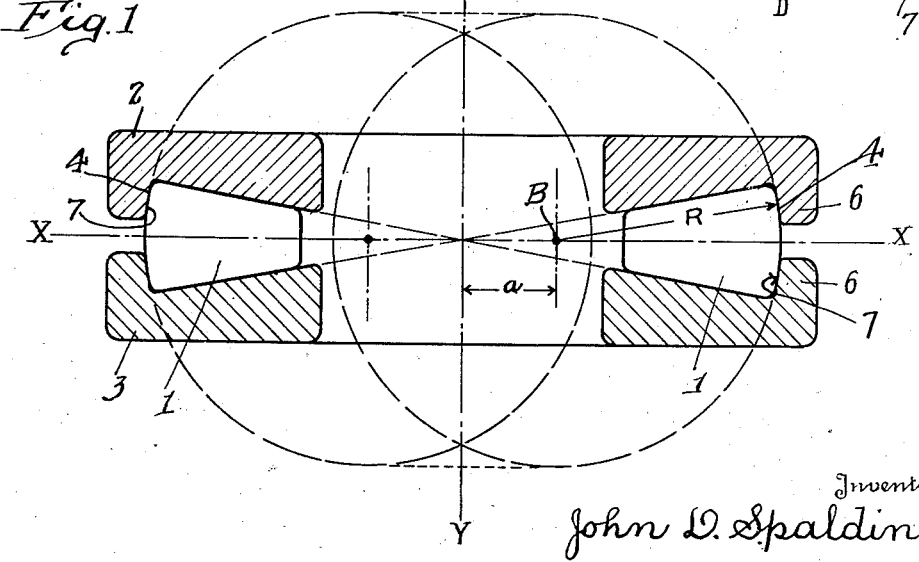
Figure 1 is a sectional side elevation of a diagrammatic form of a preferred embodiment of my invention.

Reference to Figures 1 and 2 will show that the end surface 4 of the roller 1 is generated on the surface of a sphere of radius R whose center lies on the axis of rotation of the roller 1 at a distance $a$ from the rotational axis Y—Y of the bearing. As here shown, the distance $a$ has been exaggerated for the purposes of illustration. The flange surface 7 is not coincident with the spherical surface 4, but comprises a portion of a surface of revolution formed about the rotational axis Y—Y of the bearing and with $R_1$ as its maximum radius. The relationship of these surfaces is such as to form in advance of each roller 1 in the direction of rotation around the rotational axis Y—Y a clearance indicated at C and between the surfaces 4 and 7. This clearance is of a magnitude to form an effective oil wedge between the end surface of the roller and the guide surface 7.

Expressed geometrically in rectilinear coordinates, the end surface 4 of the roller 1 comprises a portion of a surface of revolution (a sphere) generated by revolving a circle in the X—Y plane with center at B about the axis X—X. The equation of this circle is:

$$(x-a)^2 + y^2 = R^2$$

where Y—Y is the rotational axis of the bearings.

Figure 6:
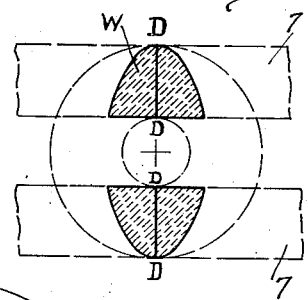
Figure 6 is a schematic end view of the roller bearing illustrating the theoretical line contact with the guide flange and illustrating theoretically the oil wedge maintained between the guide roller and the guide flange under load.

Furthermore, the flange surface 7 is a portion of a surface of revolution (a torus) generated by revolving this same circle about the Y—Y axis. Theoretically then, the sphere and the torus have contact only along the line D—D (Figure 6) under no load conditions. Under load, however, due to deformation of the surfaces 4 and 7, the contact changes from the line contact D—D into a surface contact diagrammatically illustrated at W (Figure 6).

It will be noted that this contact area W is less than the whole amount of surface 4 adjacent the flange surface 7 at any given instant. The outer periphery of the surface 4 on the large end of the roller 1 has clearance with respect to the flange surface 7 along its entire length except at the points D. It is apparent from the shape of the area of contact W that sliding movement of the contacting surfaces 4 and 7 is confined to those portions which have the least relative movement.

An important advantage of this construction is that it results in the formation of an oil film or wedge on the entire contact area W, and this oil wedge is automatically maintained as the roller turns because of the gradually but constantly decreasing clearance between the advancing edge of the end surface 4 and the flange surface 7. Oil entering this wedge as the roller 1 advances around its rotational axis maintains an oil film between the contacting surfaces 4 and 7 even under the heaviest loading conditions where the magnitude of the clearance C is such as to initiate this lubrication wedge.

Figure 4:
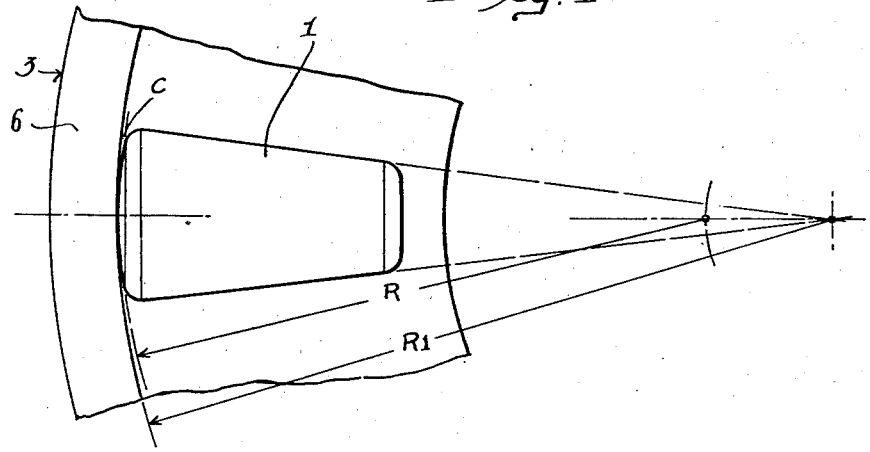
Figure 4 is a fragmentary top plan view of the structure as illustrated in Figure 3, the upper race being omitted.
Figure 3:
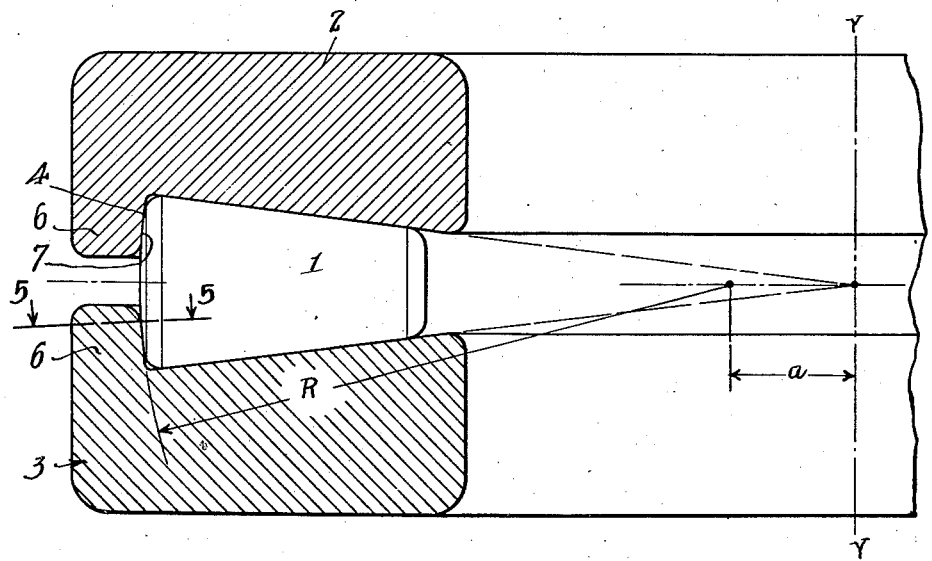
Figure 3 is an enlarged sectional side elevation.
Figure 5:
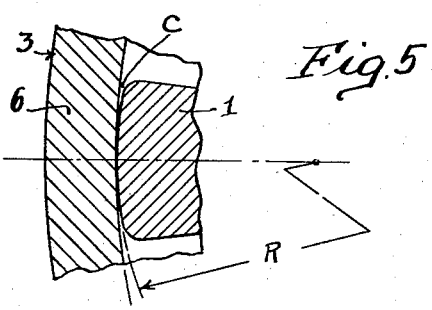
Figure 5 is a sectional view taken substantially on the line 5—5 of Figure 3.

As illustrated in Figure 4, the relationship of the radius R to the radius $R_1$ determines the magnitude of the clearance C. As the radius R approaches the radius $R_1$, the clearance diminishes, and if the radius R is reduced with respect to the radius $R_1$, the clearance is increased. The condition of too little clearance prevents formation of an oil wedge, and conversely, too great clearance restricts the area of contact so that the unit pressure resulting from heavy loading acts to break down the protective oil film.

Having fully described my invention, it is to be understood that I do not wish to be limited to the details herein set forth, but my invention is of the full scope of the appended claims.

I claim:

1. In a roller bearing, the combination of a roller having an end surface, a race for said roller, a guide flange associated with said race and adapted to receive thrust imparted by said end surface of the roller, the operative surface of said guide flange constituting a portion of a surface of revolution generated by revolving a certain curve about the rotational axis of the bearing, the end surface of the roller constituting a portion of another surface of revolution generated by revolving the same curve about the axis of the roller, the said surfaces of revolution theoretically having in common only a single curve of constant radius for any given position of the roller relative to the race, and the adjacent portions of said surfaces gradually diverging outwardly from said common curve substantially for the purpose described.

2. In a roller bearing, the combination of a roller having an end surface, a race for said roller, a guide flange associated with said race and adapted to receive thrust imparted by said end surface of the roller, the operative surface of said guide flange constituting a portion of a surface of revolution generated by revolving a certain curve about the rotational axis of the bearing, the end surface of the roller constituting a portion of another surface of revolution generated by revolving the same curve about the axis of the roller, the said curve being defined in rectilinear coordinates by the equation:

$$(x-a)^2 + (y)^2 = R^2$$

where $a$ and R are finite constants greater than zero and where $a$ is less than R, and where the Y axis is coincident with the axis of the bearing.

3. In a roller bearing, the combination of a roller, an end surface on said roller comprising a portion of a sphere, a race for said roller, a guide flange associated with said race and adapted to receive thrust imparted by said end surface of the roller, the operative surface of said guide flange constituting a portion of a surface of revolution, said surface of revolution being generated by revolving an element of said sphere about the rotational axis of the bearing, said sphere and said surface of revolution having only a single line element in common for any operative position of the roller relative to the race, and the adjacent portions of said sphere and said surface of revolution gradually diverging from said common line element whereby an oil wedge is formed over a substantial portion of the end surface of the roller.

4. In a roller bearing, the combination of a roller having an end surface comprising a portion of a sphere, a race for said roller, a guide flange associated with said race and adapted to receive end thrust imparted by the end surface of the roller, the working surface of said guide flange having the same radius of curvature as the sphere in a plane defined by the axis of the roller and the axis of the bearing, and having a slightly larger radius of curvature in the direction of the path of travel of the roller end substantially for the purpose described.

JOHN D. SPALDING.